US012505148B2

(12) United States Patent
Hintz et al.

(10) Patent No.: US 12,505,148 B2
(45) Date of Patent: Dec. 23, 2025

(54) DYNAMIC DEPTH DOCUMENT RETRIEVAL FOR ENTERPRISE LANGUAGE MODEL SYSTEMS

(71) Applicant: Microsoft Technology Licensing, LLC, Redmond, WA (US)

(72) Inventors: Gerold Hintz, Bavaria (DE); Michael J. Taylor, Cambridge (GB); Jacob D. Stevenson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 18/545,619

(22) Filed: Dec. 19, 2023

(65) Prior Publication Data

US 2025/0200100 A1  Jun. 19, 2025

(51) Int. Cl.
  *G06F 16/383* (2019.01)
  *G06F 16/332* (2025.01)
  *G06F 40/284* (2020.01)
  *G06F 40/40* (2020.01)

(52) U.S. Cl.
  CPC ........ *G06F 16/383* (2019.01); *G06F 16/3326* (2019.01); *G06F 40/284* (2020.01); *G06F 40/40* (2020.01)

(58) Field of Classification Search
  CPC .. G06F 16/383; G06F 16/3326; G06F 40/284; G06F 40/40
  USPC .......................................................... 704/9
  See application file for complete search history.

(56) References Cited

U.S. PATENT DOCUMENTS

| | | | | |
|---|---|---|---|---|
| 7,702,671 | B2 * | 4/2010 | Jacobs ................ | G06F 16/9538 707/706 |
| 7,904,440 | B2 * | 3/2011 | Anderson ............. | G06F 16/951 707/723 |
| 8,041,710 | B2 * | 10/2011 | He ...................... | G06F 16/9535 707/748 |
| 8,176,069 | B2 * | 5/2012 | Timm .................. | G06F 16/951 707/767 |
| 8,595,252 | B2 * | 11/2013 | Wu ..................... | G06F 16/9535 707/765 |
| 9,195,640 | B1 * | 11/2015 | Donneau-Golencer ...................... | G10L 15/00 |

(Continued)

OTHER PUBLICATIONS

"Poisson binomial distribution", Retrieved from: https://en.wikipedia.org/wiki/Poisson_binomial_distribution, Jun. 22, 2023, 4 Pages.

(Continued)

*Primary Examiner* — Thuykhanh Le

(57) ABSTRACT

Systems and methods for resource-efficient retrieval of information using a generative AI model are disclosed. An input query requesting information from a set of documents is used in a prompt for a generative AI model to generate a search query to identify the documents relevant to the input query and their respective relevancy scores. The input query is used as an input another model to determine a depth score indicating a predicted number of documents needed to retrieve the information. Based on the depth score and the relevancy scores of the relevant documents, the system extracts grounding data from the identified relevant documents to generate an answer synthesis prompt for the generative AI model. The generative AI model processes the second to produce a response to the input query including the requested information.

20 Claims, 11 Drawing Sheets

(56) References Cited

U.S. PATENT DOCUMENTS

| | | | |
|---|---|---|---|
| 9,330,165 B2* | 5/2016 | Jiang | G06F 16/285 |
| 10,839,013 B1* | 11/2020 | Werris | G06F 40/216 |
| 11,048,773 B1* | 6/2021 | Gokhan | G06F 18/285 |
| 11,392,651 B1* | 7/2022 | McClusky | G06F 16/906 |
| 11,481,417 B2* | 10/2022 | Tiwari | G06F 16/3344 |
| 11,681,364 B1* | 6/2023 | Zhang | G06N 3/0455 |
| | | | 345/156 |
| 11,699,256 B1* | 7/2023 | Willardson | G06F 40/35 |
| | | | 345/633 |
| 11,755,595 B2* | 9/2023 | Motte | G06F 40/253 |
| 11,822,562 B2* | 11/2023 | Tulshan | G06F 40/40 |
| 11,972,223 B1* | 4/2024 | DeFoor | G06N 20/00 |
| 12,050,872 B2* | 7/2024 | Tomasi | G06F 40/40 |
| 12,299,028 B2* | 5/2025 | Lacko | G06F 16/583 |
| 2005/0055341 A1* | 3/2005 | Haahr | G06F 16/285 |
| 2010/0121841 A1* | 5/2010 | He | G06F 16/9535 |
| | | | 707/E17.014 |
| 2010/0169352 A1* | 7/2010 | Flowers | G06F 16/951 |
| | | | 707/E17.071 |
| 2010/0211588 A1* | 8/2010 | Jiang | G06F 16/332 |
| | | | 707/E17.109 |
| 2010/0306229 A1* | 12/2010 | Timm | G06F 16/162 |
| | | | 707/767 |
| 2012/0054216 A1* | 3/2012 | Haahr | G06F 16/285 |
| | | | 707/765 |
| 2012/0078935 A1* | 3/2012 | Parikh | G06F 16/3338 |
| | | | 707/765 |
| 2012/0136723 A1* | 5/2012 | Larner | G06Q 30/0255 |
| | | | 705/14.54 |
| 2014/0149415 A1* | 5/2014 | Haahr | G06F 16/242 |
| | | | 707/765 |
| 2014/0330804 A1* | 11/2014 | Bao | G06F 16/3338 |
| | | | 707/706 |
| 2015/0363485 A1* | 12/2015 | Bennett | G06F 16/86 |
| | | | 707/694 |
| 2016/0078086 A1* | 3/2016 | Nowak-Przygodzki | |
| | | | G06F 16/24578 |
| | | | 707/723 |
| 2016/0321297 A1* | 11/2016 | Jurca | G06F 16/29 |
| 2017/0124091 A1* | 5/2017 | Nowak-Przygodzki | |
| | | | G06F 16/9535 |
| 2018/0052823 A1* | 2/2018 | Scally | G06F 40/284 |
| 2019/0095419 A1* | 3/2019 | Motte | G06F 40/295 |
| 2020/0050638 A1* | 2/2020 | Hancock | G06F 16/90344 |
| 2020/0364233 A1* | 11/2020 | Chan | G06F 16/24578 |
| 2021/0133268 A1* | 5/2021 | Ghorbani | G06F 16/90332 |
| 2021/0295410 A1* | 9/2021 | Su | G06Q 30/0631 |
| 2021/0312942 A1* | 10/2021 | Rudzicz | A61B 5/4803 |
| 2022/0067284 A1* | 3/2022 | He | G06F 16/345 |
| 2022/0414128 A1* | 12/2022 | Raimondo | G06N 20/00 |
| 2023/0073243 A1* | 3/2023 | Kerr | G06F 16/148 |
| 2023/0073550 A1* | 3/2023 | Liu | G06F 40/279 |
| 2023/0326212 A1* | 10/2023 | Chawda | G06V 10/82 |
| | | | 382/103 |
| 2023/0409815 A1* | 12/2023 | Peng | G06F 16/148 |
| 2024/0086431 A1* | 3/2024 | Guberman | G06Q 50/18 |
| 2024/0143293 A1* | 5/2024 | Peng | G06F 40/166 |
| 2024/0143583 A1* | 5/2024 | Menaged | G06F 40/35 |
| 2024/0394286 A1* | 11/2024 | Honke | G06F 40/284 |
| 2024/0419695 A1* | 12/2024 | Matson | G06F 40/40 |
| 2024/0428008 A1* | 12/2024 | Abraham | G06F 16/3329 |
| 2025/0061140 A1* | 2/2025 | Levinson | G06F 40/30 |
| 2025/0069010 A1* | 2/2025 | Wicaksono | G06F 40/20 |
| 2025/0086211 A1* | 3/2025 | Bolcer | G06F 16/3344 |
| 2025/0110973 A1* | 4/2025 | Yan | G06F 16/3326 |
| 2025/0131033 A1* | 4/2025 | Yates | G06F 16/438 |
| 2025/0181620 A1* | 6/2025 | Lipka | G06F 40/30 |

OTHER PUBLICATIONS

"tsakim / poibin", Retrieved from: https://github.com/tsakim/poibin/blob/master/poibin.py, Sep. 5, 2023, 7 Pages.

Sun, et al., "Is ChatGPT Good at Search? Investigating Large Language Models as Re-Ranking Agent", In Repository of arXiv:2304.09542v1, Apr. 19, 2023, 15 Pages.

Zhu, et al., "Large Language Models for Information Retrieval: A Survey", In Repository of arXiv:2308.07107v2, Aug. 15, 2023, pp. 1-26.

* cited by examiner

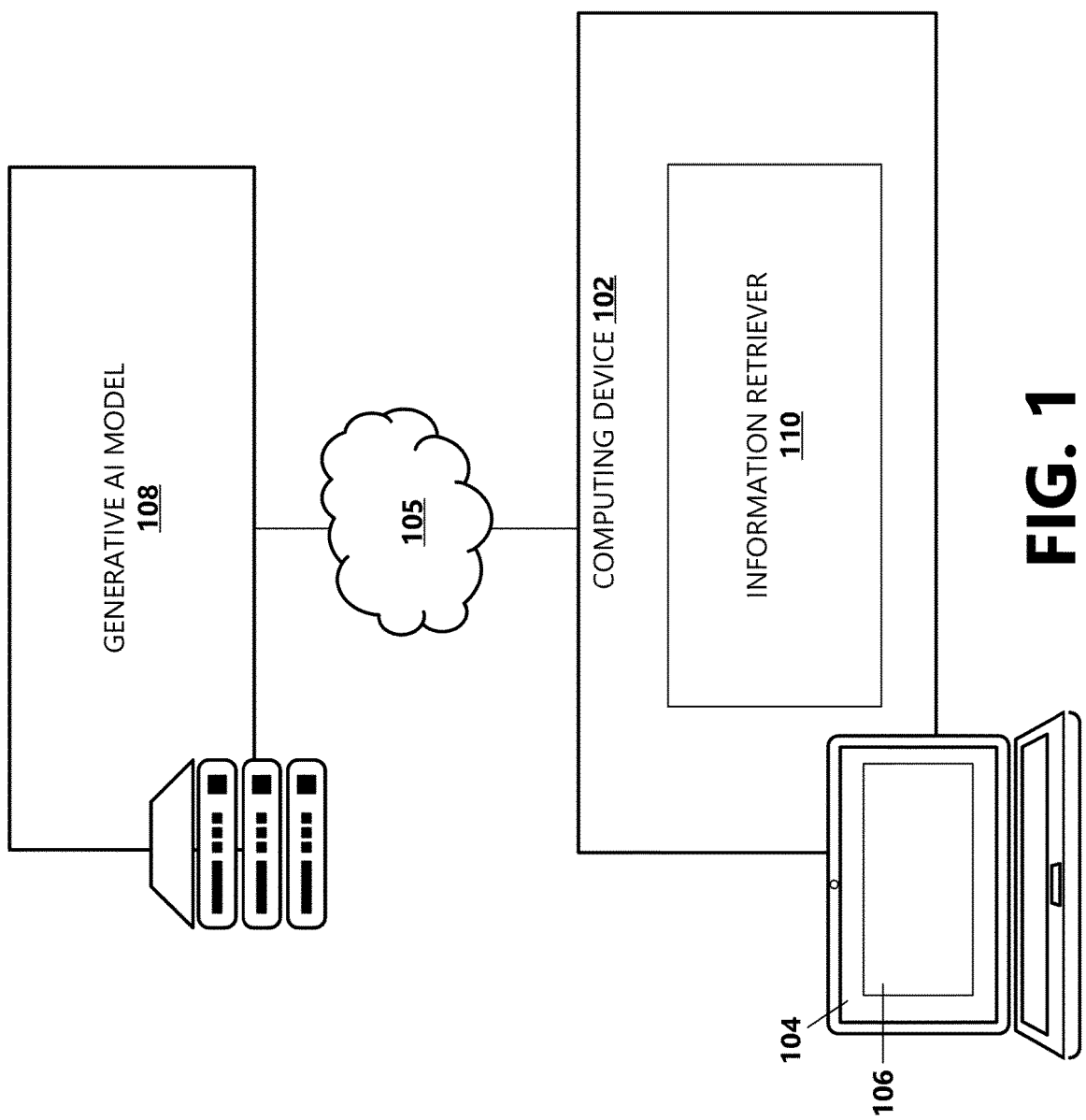

DYNAMIC DEPTH DOCUMENT RETRIEVAL FOR ENTERPRISE LANGUAGE MODEL SYSTEMS

BACKGROUND

Traditional search applications are designed to help individuals and organizations find relevant documents generated by individuals in an organization quickly and easily. However, an individual performing the search needs to process information in documents listed in search results, causing one to open and review each of the search results. Reviewing individual documents to find the relevant documents and relevant information within them is time-consuming and reduces the overall efficiency of finding information and results in wasted computing resources.

Generative AI models, on the other hand, can review the information in documents and provide processed information in response to a prompt, saving the user time and effort. Generative AI models pre-ingest large amounts of data and then respond to user queries with processed information based on the ingested data.

It is with respect to these and other considerations that examples have been made. In addition, although relatively specific problems have been discussed, it should be understood that the examples should not be limited to solving the specific problems identified in the background.

SUMMARY

The disclosed systems and methods pertain to retrieving information from a database, such as an enterprise database storing documents of a particular company, using a language model. To perform this task, the data in the database is analyzed for use in an AI prompt, such as for use as grounding data. The aim is to identify the content of relevant documents in the database and include the content in an AI prompt that a language model processes to generate an output payload. This approach conserves resources by identifying only the relevant documents and their content to be included in a prompt for the language model, rather than processing all the documents in the database. Moreover, fewer tokens in the prompt are required for still producing accurate, high-quality results.

At runtime, when an input query is received, a generative AI model processes the query as part of an AI prompt. The generative AI model produces a search query that is executed against the database of documents to produce a list of relevant documents. The returned relevant documents may each have a relevancy score or indication that indicates the relevancy of the documents to the input query. The disclosed system also reviews the input query to determine the depth of documents that should be used to respond to the input query (e.g., a depth score for the input query).

The data from relevant documents and the input query are then incorporated into another AI prompt as grounding data that can be used in responding to the initial input query. The relevancy scores of the document and the depth score of the input query are used to identify a minimal subset of documents and the content within this minimal subset of documents needed to determine a response to a query. This approach reduces the time and resources required to process the documents and provide a response. It also helps conserve resources by having an optimal size prompt with only relevant information. This step ensures that only the most relevant and useful documents are used to produce the ultimate response to the user while minimizing the number of tokens required for processing and responding to the input query.

The summary of the content identified is then used within an AI prompt to the language model to determine the response to a query against a private database of information. This process ensures that the response provided is accurate, relevant, and based on the most relevant subset of documents available. The disclosed systems and methods offer an efficient and effective way to retrieve information from a private database using a language model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 1 is a block diagram of a system in which a dynamic depth document retrieval system is implemented according to an example.

DETAILED DESCRIPTION

Examples described in this disclosure relate to systems and methods for information based on content in documents provided as input through the use of a language model, such as a large language model (LLM), multimodal model, or other type of generative AI model. In an example implementation, an information retriever application is used to synthesize, in real-time, content in documents to generate a response to input query received from the user.

As briefly discussed above, generative AI models may be used in systems that can extract data from a set of documents stored in a database. Using generative AI models in enterprise scenarios can be challenging, primarily due to attempting to extract data from private repositories on which the generative AI model is not trained. Thus, the information provided in the prompt must be comprehensive enough to enable effective responses to user queries. However, the number of documents in an enterprise setting may be much larger than the size of text allowed in a prompt for a generative AI model. There is a benefit to providing the most relevant information in the documents as part of the prompt to respond to user queries effectively.

Accordingly, the technology disclosed herein is able to identify a depth score for an input query received from the user. The depth score generally indicates how many documents are likely needed to accurately respond to the input query. In addition, relevant documents to the input query are identified and a relevancy score may be generated for each of the identified relevant documents. Based on the depth score of the input query and the relevancy scores of the documents, a minimal set of documents are identified. Data from that minimal set of documents is then included as grounding data in an AI prompt that is processed by the generative AI model to generate a response to the initial input query from the user.

Figure 7:
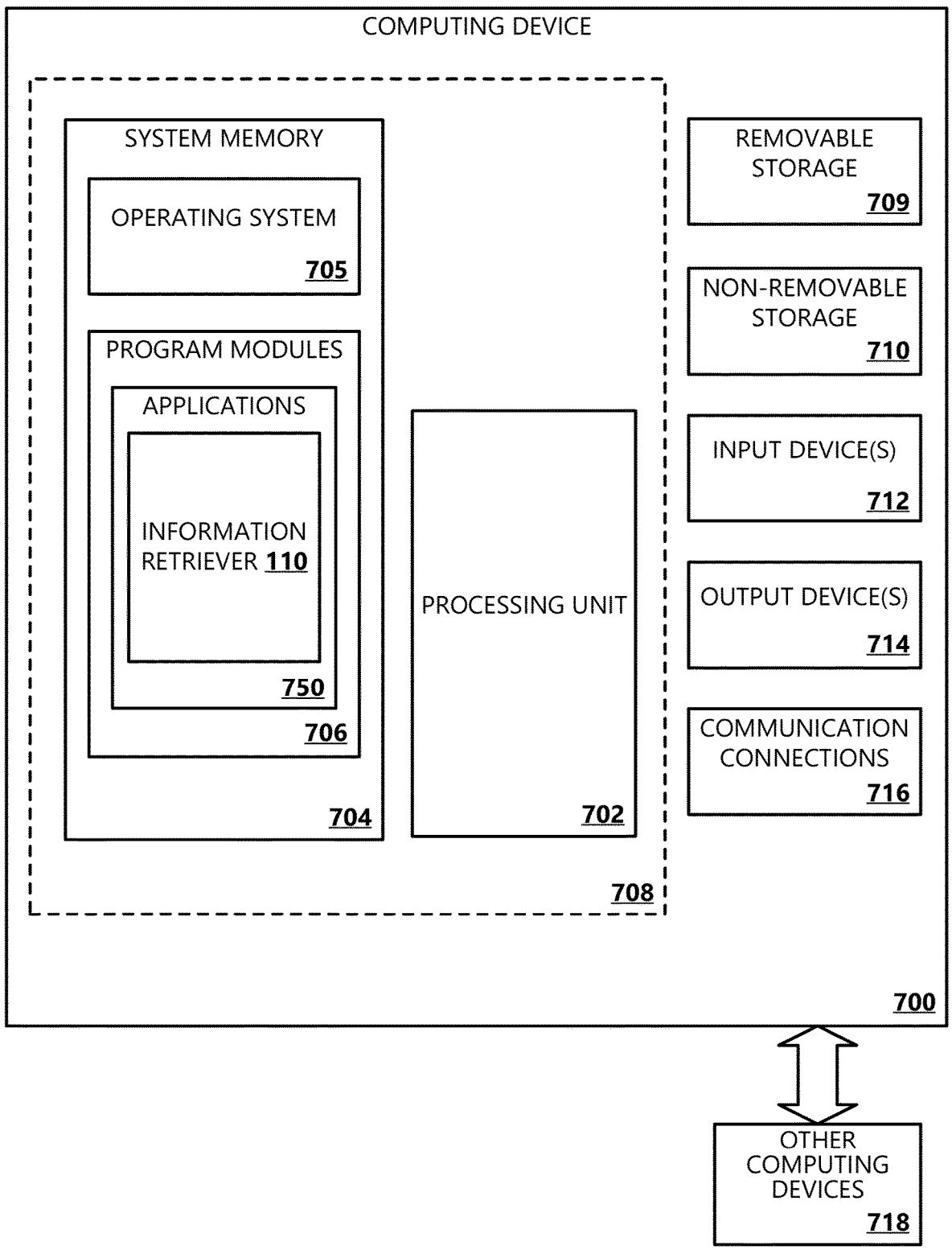
FIG. 7 is a block diagram illustrating example physical components of a computing device with which aspects of the disclosure may be practiced.

FIG. 1 is a block diagram of an example system 100 for providing responses to queries based on information in documents in accordance with an example. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 7. In another example, the components of systems disclosed herein are distributed across multiple processing devices. For instance, input may be entered on a user device or client device, and information may be processed on or accessed from other devices in a network, such as one or more remote cloud devices or web server devices.

The example system 100 synthesizes information response using a generative AI model 108, which may be an LLM, a multimodal model, or other types of generative AI models. Example models may include the GPT models from OpenAI, BARD from Google, and/or LLaMA from Meta, among other types of generative AI models. According to an aspect, the system 100 includes a computing device 102 that may take a variety of forms, including, for example, desktop computers, laptops, tablets, smartphones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

In an example implementation, computing device 102 includes a plurality of search engines (collectively, search applications) for performing different tasks, such as searching documents, synthesizing content in documents, and presenting relevant search results, etc. According to an example implementation, the search applications include at least one information retriever 110 that operates to allow users to send queries and receive information as a response. Queries can be in various formats, such as text, audio, images, and/or video. Information retriever 112 may be a local application, a web-based application accessed via a web browser, and/or a combination thereof (e.g., some operations may be performed locally and other operations may be performed at a server). Information retriever 110 has one or more application UIs 106 by which a user can generate queries, view responses, and interact with features provided by the information retriever 112. For example, an application UI 106 may be presented on display screen 104. In some examples, the operating environment is a multi-application environment by which a user may view and interact with information retriever 110 through multiple application UIs 106.

In an example implementation, information retriever 110 determines a subset of documents, including content relevant to a user query, and retrieves a summary and/or excerpt of the relevant content into an AI prompt for the generative AI model 108. The generative AI model 108 then generates an output payload based on the prompt. The output payload is parsed and otherwise processed to generate and display the response discussed herein. These and other examples are described below in further detail with reference to FIGS. 2-7.

According to example implementations, generative AI model 108 is trained to understand and generate sequences of tokens, which may be in the form of natural language (e.g., human-like text). In various examples, generative AI model 108 can understand complex intent, cause and effect, perform language translation, semantic search classification, complex classification, text sentiment, summarization, summarization for an audience, and/or other natural language capabilities.

In some examples, generative AI model 108 is in the form of a deep neural network that utilizes a transformer architecture to process the text it receives as an input or query. The neural network may include an input layer, multiple hidden layers, and an output layer. The hidden layers typically include attention mechanisms that allow generative AI model 108 to focus on specific parts of the input text and generate context-aware outputs. Generative AI model 108 is generally trained using supervised learning based on large amounts of annotated text data and learns to provide a response synthesizing relevant content.

The size of generative AI model 108 may be measured by its number of parameters. For instance, as one example of an LLM, the GPT-4 model from OpenAI has billions of parameters. These parameters may be weights in the neural network that define its behavior, and a large number of parameters allow the model to capture complex patterns in the training data. The training process typically involves updating these weights using gradient descent algorithms and is computationally intensive, requiring large amounts of computational resources and a considerable amount of time. However, generative AI model 108 in the examples herein is pre-trained, meaning that generative AI model 108 has already been trained on a large amount of data. This pre-training allows the model to have a strong understanding of the structure and meaning of text, which makes it more effective for the specific tasks discussed herein.

Generative AI model 108 may operate as a transformer-type neural network. Such an architecture may employ an encoder-decoder structure and self-attention mechanisms to process the input data (e.g., the prompt). Initial processing of the prompt may include tokenizing the prompt into tokens that may then be mapped to a unique integer or mathematical representation. The integers or mathematical representations are combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The above-mentioned self-attention mechanism is applied first, followed by the feed-forward neural network. The feed-forward neural network may be the same for each position, and a simple neural network may be applied to each attention output vector. The output of one layer becomes the input of the next. This means that each layer incrementally builds upon the understanding and processing of the data made by the previous layers. The output of the final layer may be processed and passed through a linear layer and a SoftMax activation function. This outputs a probability distribution over all possible tokens in the model's vocabulary. The token(s) with the highest probability is selected as the output token(s) for the corresponding input token(s).

In example implementations, generative AI model 108 operates on a device located remotely from the computing device 102. For instance, the computing device 102 may communicate with generative AI model 108 using one or a combination of networks 105 (e.g., a private area network (PAN), a local area network (LAN), and a wide area network (WAN)). In some examples, generative AI model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

The disclosed systems in FIGS. 2A-2E present a novel way to optimize the available prompt space of a generative AI model by leveraging predicted depth of documents needed to respond to a query and relevance scores of documents. The relevance scores of documents can be obtained using an already available search engine that produces a ranked list of the most relevant results. This allows the trade-off of the total content length of all documents with the number of documents to be included in an AI prompt as grounding data for a generative AI model.

The advantage of the above approach is twofold. First, the technology disclosed herein results in an increase in the overall amount of relevant information to be included in a finite prompt space while minimizing the irrelevant information. Second, a decrease in prompt space utilization allows for saving computational resources when executing a generative AI model (e.g., by processing fewer tokens). This results in a system replying to input queries from a user with a higher chance of end-to-end success in a resource-efficient manner that may also reduce the overall latency between receiving the initial input query and ultimately surfacing a response to that query.

Figure 2A:
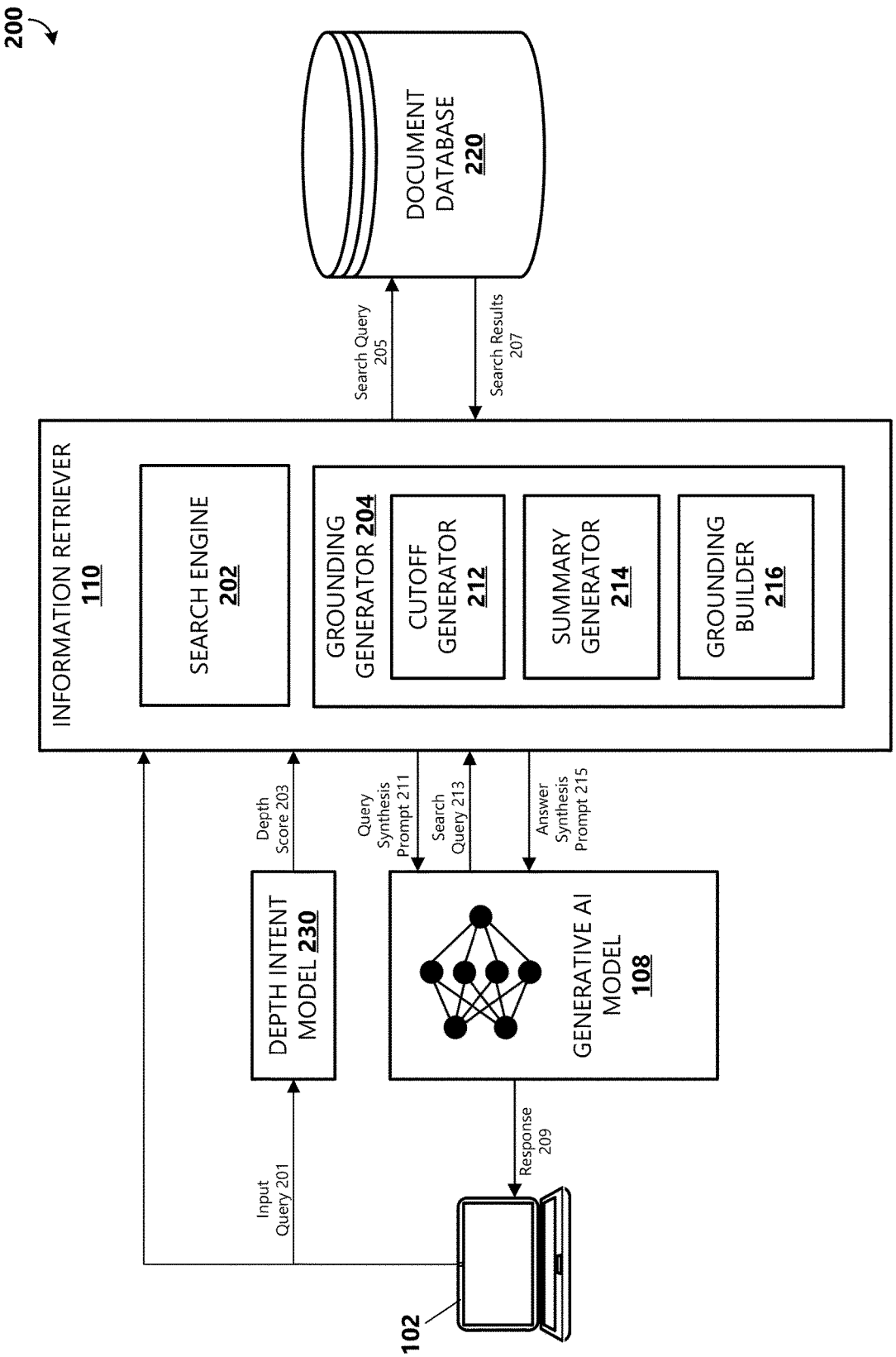
FIG. 2A is a flow diagram of an example embodiment of a dynamic depth document retrieval system shown in FIG. 1.

FIG. 2A is a flow diagram of an example dynamic depth document retrieval system 200, which is an example embodiment of system 100 shown in FIG. 1. System 200 includes an information retriever 110 that includes search engine 202 and grounding generator 204. Information retriever 110 is in communication with document database 220. The information retriever 110 is also in communication with generative AI model 108 and the depth intent model 230. The grounding generator 204 may include, or provide access to, cutoff generator 212, summary generator 214, and grounding builder 216.

In some examples, summary generator 214 and grounding building 216 are overlapping components that may pass output between the two components. For example, a document's grounding may be formed from a single sub-section or multiple sub-sections of the original documents extracted by a grounding builder 216 and may pass to summary generator 214 to summarize the extracted sections of the original documents. Such summarization processes may be referred to as extractive summarization. In another example, an entirely new summary, referred to as the abstractive summary, is synthesized from the original document by summary generator 214 and may pass to grounding generator 216 to extract grounding from the synthesized summary of the original document.

In some examples, system 200 is a Large Language Model (LLM) based dialog system that integrates enterprise knowledge by allowing generative AI model 108 access to search skills provided by search engine 202. Search engine 202 is responsible for providing relevant document content to fill a prompt with context for generative AI model 108 to respond to input query 201. The relevant document content will be referred to as grounding data.

Search engine 202 is a search application that retrieves a ranked list of top n documents. The objective of System 200 is to retrieve an optimal amount of relevant grounding. The number of documents, as well as their corresponding grounding, is dynamic and scenario dependent.

For example, in some scenarios, only a few documents or just a single document is highly relevant to the initial input query. However, the single document may be exceptionally long, and the prompt space for generative AI model 108 is filled with more content from this single or few documents. In other scenarios, the content of the documents is less important, and the prompt for generative AI model 108 may require an exhaustive list of documents to be included to provide an accurate response to the input query.

As illustrated in FIG. 2A, computing device 102 begins the search for relevant information by receiving the input query 201 and transmitting the input query 201 to one or more models and/or applications. In example embodiment 200, depth intent model 230 receives input query 201 as input to identify depth score 203, which predicts the number of documents in document database 220 needed to generate a response to input query 201.

Depth intent model 230 then provides the depth score 203 to information retriever 110 to help retrieve relevant information using document database 220. Depth intent model 230 may predict depth based on the text in input query 201.

For example, an input query 201 to summarize sales statistics for the year may result in depth intent model 230 predicting a depth score of "one" because a single document, such as an annual expenses spreadsheet may provide the fully accurate answer to the input query. In another example, an input query to know how many files in the enterprise database (e.g., document database 220) were authored by each individual part of an organization results in depth intent model 230 predicting a depth score greater than one (e.g., many documents) because multiple documents are required to properly answer such an input query. However, the content required from such documents is minimal (e.g., document title and author).

Depth intent model 230 outputs depth score 203 that helps system 200 dynamically choose the number of relevant documents to use, allowing the available prompt space to be used more efficiently for a given search task to generative AI model 108. This dynamic selection of the most relevant documents helps generative AI model 108 by avoiding reliance on irrelevant documents, improving the precision of grounding and improving the quality of processed information presented as response 209.

Depth intent model 230 may be trained using logs of queries and/or clicks to access documents performed for various searches performed using a search engine against document database 220. The searches may be similar to input query 201. The search performed using a search engine would only result in list of search results. A search engine does not perform any analysis of the contents of the search results to provide a response to the input query 201. Depth intent model 230 trained using clicks data may generate a numerical value as output. The numerical value may be equal to the number of clicks performed by a user for search queries similar to input query 201 performed on a search engine.

In some examples, depth intent model 230 may be a language model trained with labels to provide a discrete signal of the depth needed for a given input query (e.g., input query 201). The discrete signal may be deep, shallow or medium indicating the number of documents needed to prepare a response to input query 201.

Information retriever 110 of system 200 may then use depth score 203 to help generate query synthesis prompt 211 for generative AI model 108 in turn to generate search query 205. Search engine 202 of information retriever 110 may form a query synthesis prompt 211 for the generative AI model 108 using depth score 203 and input query 201. Query synthesis prompt 211 may include additional instructions, in the form of static portions, that request the language model 108 detect user intent present in the input query 201, the scenario in which the input query 201 was posted, and/or segment of the documents indicated in the input query 201. In some examples, query synthesis prompt 211 may include additional instructions, in the form of static portions, that request the language model 108 detect primary topics of the input query 201, styles of the input query 201, and/or mood or tone of the input query 201. The dynamic portion of the prompt is populated with the input query 201 and, in some examples, depth score 203.

Generative AI model 108 processes query synthesis prompt 211 from search engine 202 and provides an output payload with the data requested in query synthesis prompt 211. For instance, the output payload includes a search query that may be executed to identify documents relevant to the input query. Search engine 202 receives and processes output payloads from the language model 108 to submit the search query 213 to document database 220.

Generative AI model 108 processes query synthesis prompt 211 by extracting and parsing the text in input query 201 to determine search query 213. For example, an input query to "summarize annual sales for the past year" could result in generative AI model 108 generating a search query for "find accounting documents for the past year." Generative AI model 108 generates an output payload, including search query 213 based on input query 201. Search engine 202 of information retriever receives output payload and processes it to retrieve search query 213.

System 200 uses information retriever 110 to query document database 220 using search query 205, which is a copy of search query 213. In some examples, information retriever 110 may further process search query 213 to produce a modified search query 205. Information retriever 110 may request search engine 202 to query document database 220 to identify the relevant documents. Upon querying, the document database 220 returns the relevant documents as search results 207.

Information retriever 110 may receive search results 207 including documents with content relevant to respond to input query 201. In some examples, search results 207 may include addresses, uniform resource locators (URLs), or other similar locators to the documents on a file system. Search results 207 also include the relevancy scores of the documents. In some examples, search results 207 may include sections of documents in document database 220. System 220 may associate relevancy scores with sections of documents similar to the documents.

Search results 207 are one or more documents relevant to search query 205. Search results 207 may thus be tied to, or correlated with, the input query 201 for which each of the search results was identified.

Upon receiving search results, information retriever 110 may process the documents. Information retriever 110 may request grounding generator 204 to help process documents and generate grounding data from the documents, which is incorporated into a prompt for generative AI model 108 to produce response 209 to input query 201. Extracting of the grounding data may be based both on the depth score 203 and the relevancy scores of the search results 207.

Grounding generator 204 may be a part of a separate service or application, such as a cloud-based service. In other examples, grounding generator 202 may be part of (e.g., a component of) the search engine 202. For instance, the grounding generator 204 may form a portion of the software code that defines the search engine 202.

In some examples, grounding generator 204 communicates with search engine 202 to receive relevant documents for an input query from search engine 202. For instance, grounding generator 204 requests and receives search results 207. Search results 207 are documents that are relevant to input query 201.

Information retriever 110 then forms an answer synthesis prompt 215 for generative AI model 108. Answer synthesis prompt 215 may include the content of the search results 207. Answer synthesis prompt 215 includes the input query 201 along with content from the search results 207. Content in the search results 207 is used as grounding data by the generative AI model 108 to determine the response 209. Grounding data provides the context for generative AI model 108 to respond to input query 201.

Information retriever 110 may use grounding generator 204 to help form answer synthesis prompt 215. Grounding generator 204 generates grounding data from relevant documents (e.g., search results 207) by either extracting sections from relevant documents to form grounding or by synthesizing the summary generated by summary generator 214 to form grounding. Grounding generator 204 may extract all the content that is considered related by the search engine 202. This extraction may include extracting content from documents identified by the search query 205 with a high relevancy score for input query 201.

In other examples components of grounding generator 204 may further process search results 207 and the contents of search results 207 to generate grounding data. FIGS. 2C-2E, discussed further below, provide a detailed description of how grounding generator 204 is used to further process search results 207 to generate grounding data included in answer synthesis prompt 215. As illustrated in FIG. 2A, grounding generator 204 components may include cutoff generator 212, summary generator 214, and grounding builder 216 to generate grounding data used to help prepare response 209 to input query 201.

Cutoff generator 212 selects a subset of relevant documents (i.e., search results 207) to generate grounding data used in forming answer synthesis prompt 215. Cutoff generator 212 may utilize relevancy scores of search results 207 and the depth score 203 to determine a subset of documents.

In some examples, grounding generator 204 may further generate grounding data by including only portions of content in search results 207. Summary generator 214 may be used to generate summaries of content based on portions of the relevant documents. For instance, content extracted from the relevant documents may be included in the answer synthesis prompt 215 directly, or the extracted content may be summarized, and the resultant summaries may be incorporated into the answer synthesis prompt 215.

Generative AI model 108 processes answer synthesis prompt 215 from grounding generator 204 and provides an output payload with response 209 to input query 201. Computing device 102 processes output payload to access response 209 and present it in application UI 106 (not shown in FIG. 2A). In some examples, generative AI model 108 may review answer synthesis prompt 215 to determine its sufficiency to generate response 209. Generative AI model 108 may look for minimal sufficiency of information in answer synthesis prompt 15 to effectively respond to input query 201. Upon finding answer synthesis prompt 215 to be insufficient, generative AI model 108 may send a request to regenerate an updated answer synthesis prompt until the generative AI model 108 deems answer synthesis prompt to be sufficient. Generative AI model 108 may send the request for updated answer synthesis prompt to information retriever 110. System 200 upon receiving a request to generate an updated answer synthesis prompt will regenerate an updated search query and updated answer synthesis prompt based on search results produced by updated search query. System 200 may iteratively generate new search queries and answer synthesis prompt until generative AI model 108 provides a sufficiency confirmation to prepare response 209 for input query 201. In some examples, system 200 may allow to configure maximum number of iterations to make the answer synthesis prompt 215 to be sufficient and effective to respond to query 201.

Figure 2B:
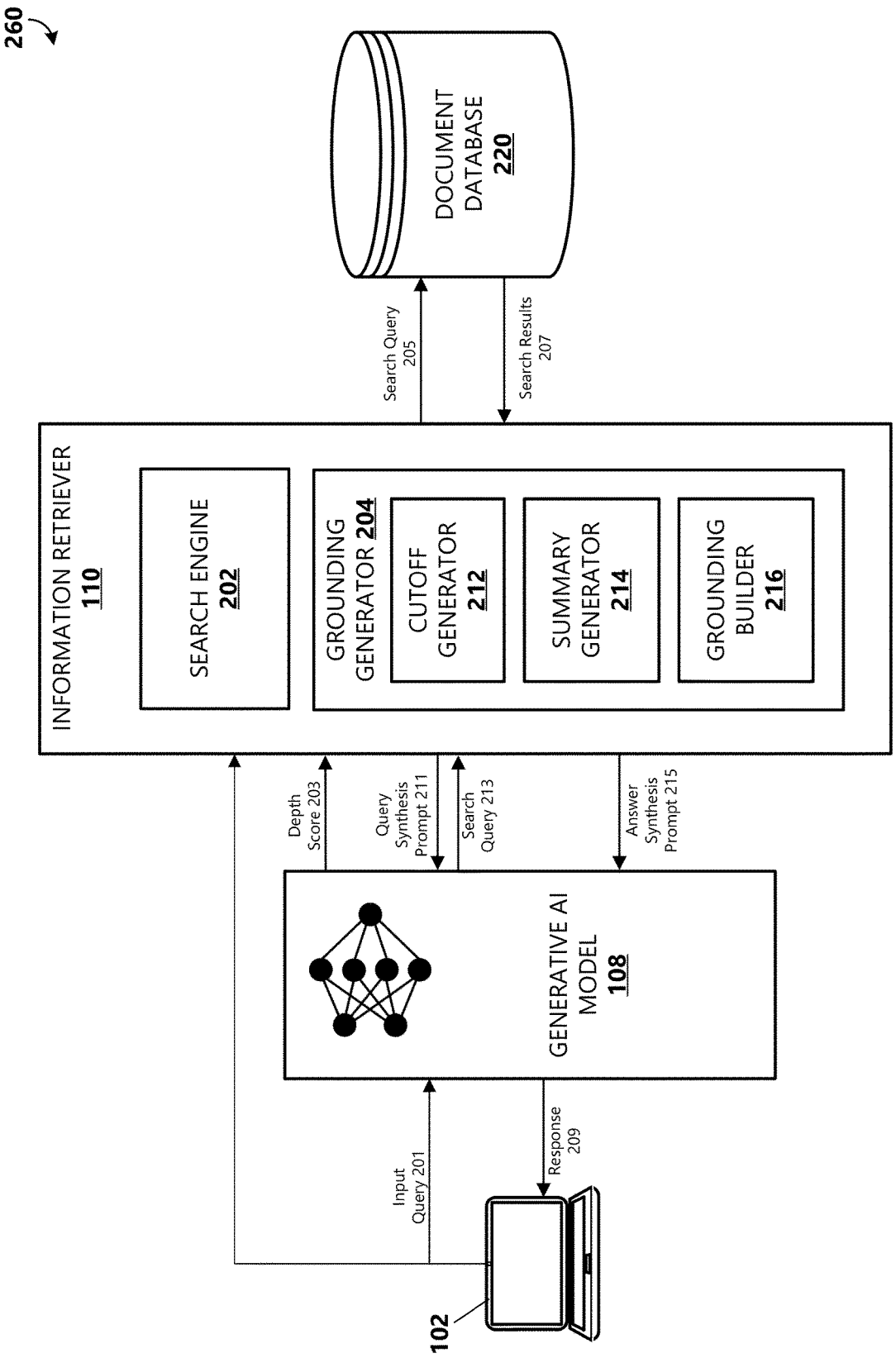
FIG. 2B is a flow diagram of an example embodiment of a dynamic depth document retrieval system shown in FIG. 1.
Figure 2C:
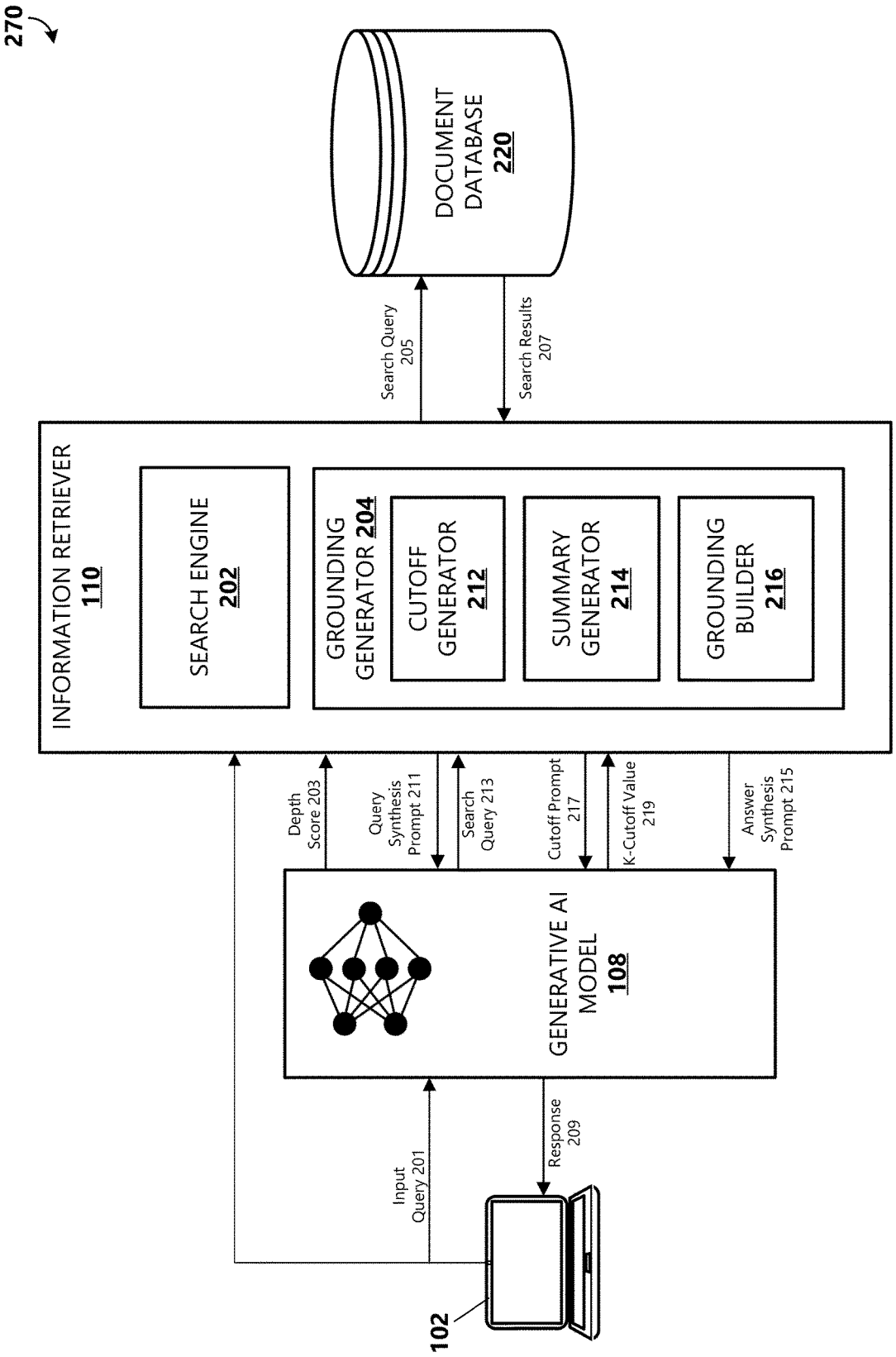
FIG. 2C is a flow diagram of an example embodiment of a dynamic depth document retrieval system shown in FIG. 1.
Figure 2D:
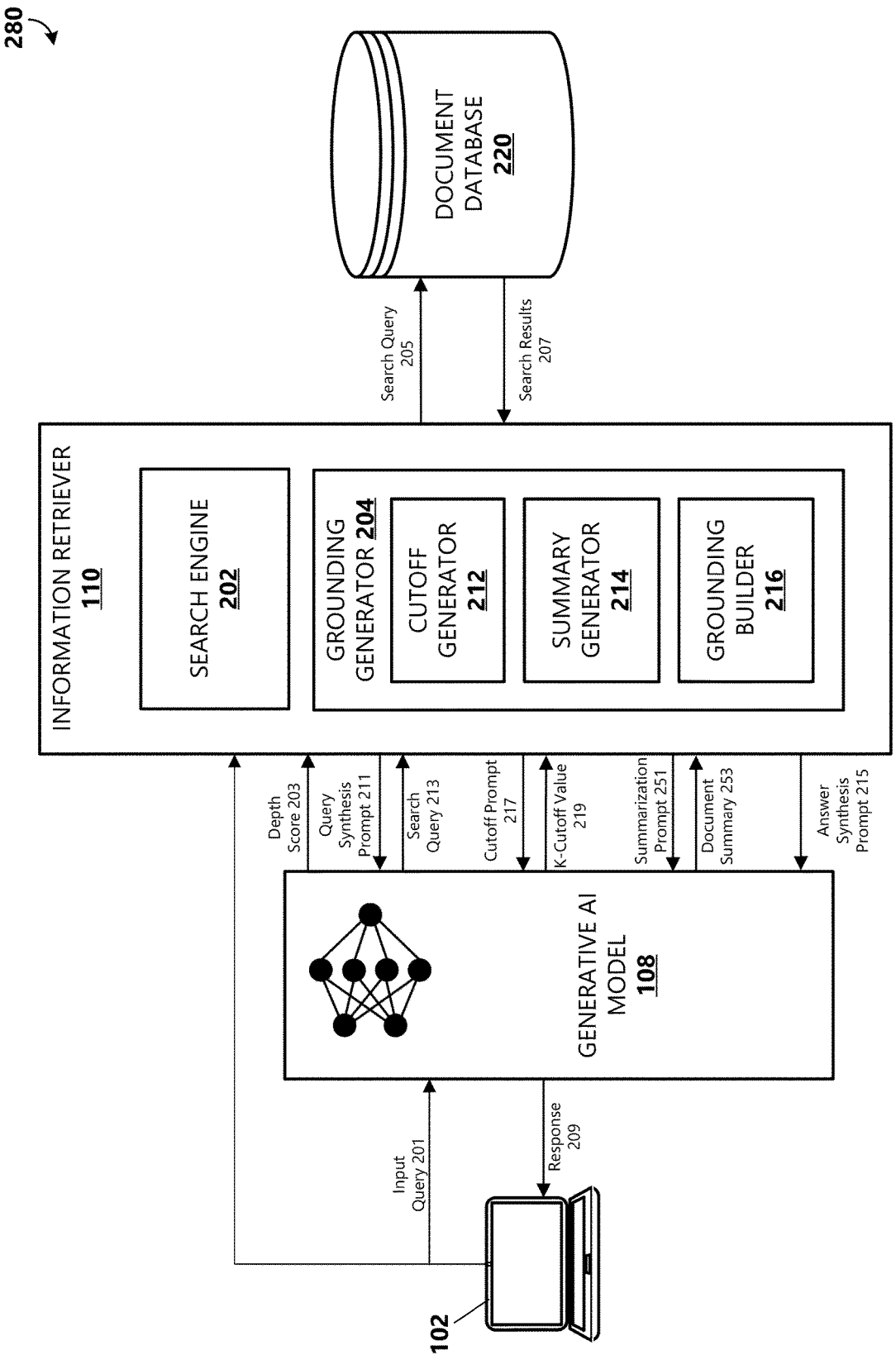
FIG. 2D is a flow diagram of an example embodiment of a dynamic depth document retrieval system shown in FIG. 1.
Figure 2E:
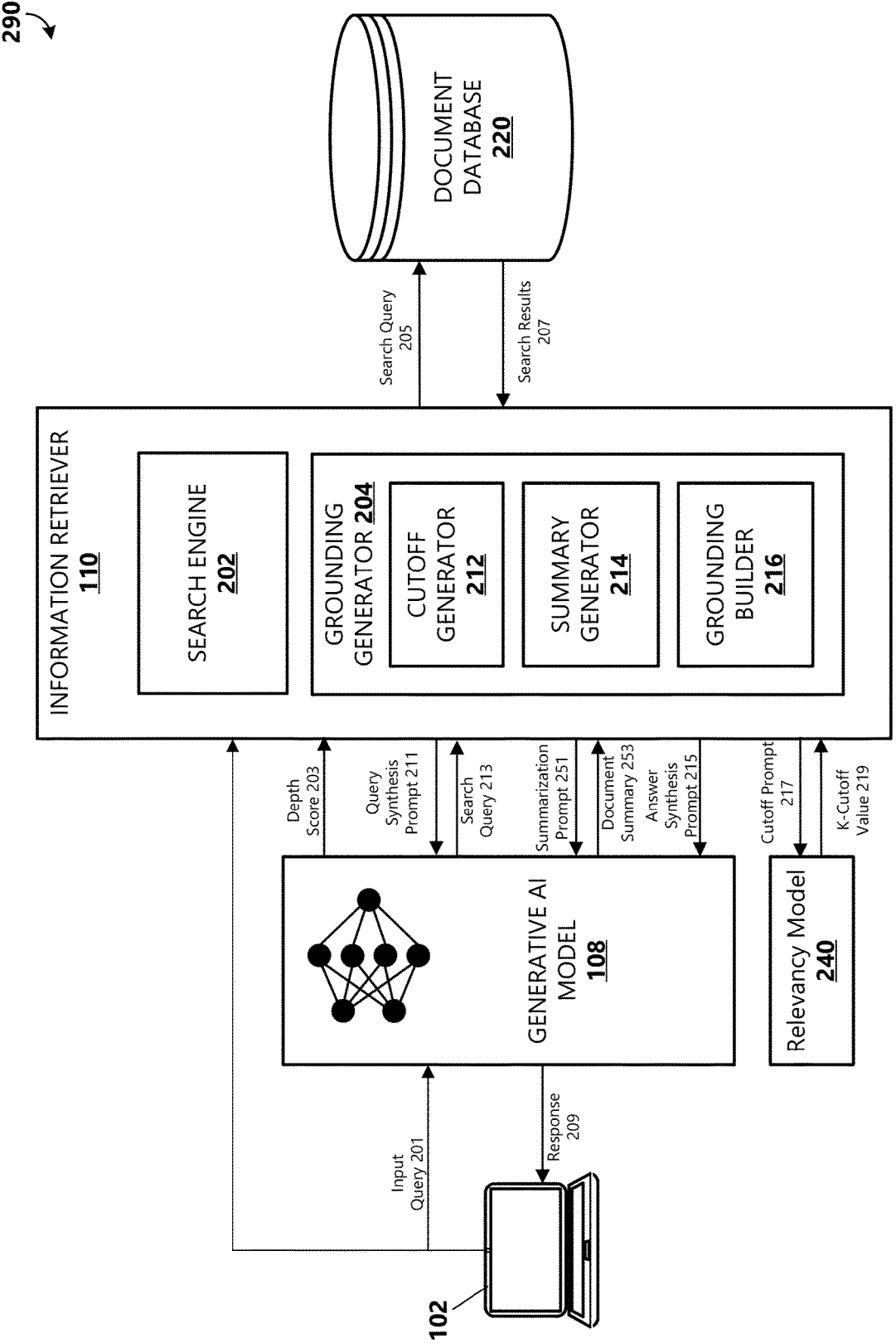
FIG. 2E is a flow diagram of an example embodiment of a dynamic depth document retrieval system shown in FIG. 1.

FIG. 2B is a flow diagram of a dynamic depth document retrieval system 260, which is an example embodiment of system 100 shown in FIG. 1. As illustrated in FIG. 2B, the flow of information in system 260 is similar to the flow of information described above in system 200. In system 260, computing device 102 transmits input query 201 to generative AI model 108 to produce depth score 203. Computing device 102 generates a prompt using input query 201 for generative AI model 108. Generative AI model 108 processes text in input query 208 to generate depth score 203, predicting a number of documents to generate response 209. The rest of the steps performed by system 260 match the steps performed by system 200 as discussed above. Accordingly, in system 260, the generative AI model 108 generates the depth score 203 rather than a separate model as shown in system 200 in FIG. 2A.

FIG. 2C is a flow diagram of a dynamic depth document retrieval system 270, which is an example embodiment of system 100 shown in FIG. 1. As illustrated in FIG. 2C, the flow of information in system 270 is similar to the flow of information described above in system 260. System 270, additionally, may form a cutoff prompt 217 for the generative AI model to help identify the minimal number of relevant documents, referred to as the K-Cutoff 219 value, needed to generate response 209. K-Cutoff value 219 identifies the minimal subset of search results 207 with the most relevant scores to respond to input query 201. Determining the K-Cutoff value 219 may be based on the relevancy scores for the documents and the depth score 203. In some examples, a distinct machine learning model may be used to determine the K-Cutoff value 219. A detailed description of using an alternative machine learning model to generate K-Cutoff value 219 is presented in FIG. 2E description below.

Information retriever 110 may use cutoff generator 212 to determine K-Cutoff value 219. Cutoff generator 212 may form cutoff prompt 217 provided to generative AI model 108 to determine K-Cutoff value 219. Cutoff prompt 217 may include search results 207 along with relevancy scores of search results 207 and depth score 203. Generative AI model 108 may process cutoff prompt 217 to output payload including K-cutoff value 219. Cutoff generator 212 may process output payload to determine K-Cutoff value 219.

As another example, the K-Cutoff value 219 may be determined by evaluating a function of the relevancy scores and the depth score. For instance, given a list of N candidate documents listed in search results 207, a K-Cutoff value 219 defining the number of documents to summarize and include in the final prompt is based upon the depth score and the relevancy scores. In some examples, cutoff generator 212 may use a function that takes as input $\{x, d\}$, where $x=[x_1, \ldots x_N]$ is a vector of relevancy scores of the top N documents, and d is the query depth score e.g., d=1 being single document. The function and produces a cut-off decision $K \in \{1 \ldots N\}$.

In some other examples, a machine learning model may learn this mapping f from data:

$$K = f(x, d).$$

In some examples, cutoff generator 212 may work with generative AI model 108 that does not take explicit depth score d (e.g., depth score 203) and instead takes the input query q (e.g., input query 201) as an input:

$$K = g(x, q)$$

In such examples, the K-Cutoff value 219 is generated based on the relevancy scores and the input query 201.

Upon generating K-Cutoff value 219, information retriever 110 of system 270 generates grounding data from a K-subset of documents (e.g., the top K documents in the search results 207 as ordered by relevance scores) and include in answer synthesis prompt 215 for generative AI model 110. Generative AI model 108 processes answer synthesis prompt 215 to generate output payload consisting response 209. Computing device 102 processes the output payload to retrieve response 209 and present it in application UI 106 (not shown in FIG. 2C).

FIG. 2D is a flow diagram of a dynamic depth document retrieval system 280, which is an example embodiment of system 100 shown in FIG. 1. As illustrated in FIG. 2D, the flow of information in system 280 is similar to the flow of information described above in system 270. In system 280, additionally, information retriever 110 may use grounding generator 204 to form a summarization prompt 251 for the generative AI model 108 to summarize relevant documents (or portions thereof) of search results 207 that meet the K-Cutoff value 219. Information retriever 110 may use summary generator 214 to generate the summaries.

Summary generator 214 may form a summarization prompt 251 that is provided to the generative AI model 108 to generate the summaries of each document in search results 207. Summarization prompt 251 may include search results 207 along with relevancy scores of search results 207 and depth score 203. In some examples, the summarization prompt may include only the top K number of documents in the search results 207. In some examples, summary generator 214 may generate a summarization prompt 251 for each document in search results 207 separately.

Generative AI model 108 may process summarization prompt 251 to output payload including document summary 253 summarizing relevant documents. Summary generator 214 may process output payload to determine document summary 253. A detailed description of components of the summary generator 214 to generate document summary 253 is presented in FIG. 3 description below. In some examples, summary generator 214 may pre-summarize documents before providing them as a prompt for generative AI model to determine if a document needs to be summarized.

In the pre-summarization stage, summary generator 214 may first check see if all N documents candidates with raw content length $L_i$ would fit into the final prompt of size $L_F$ with no compression. If not, then each candidate is checked to see if it exceeds the uniform per-result generative AI Model prompt's token limit $L_F/N$. If any document's raw length does not exceed the allowed token limit for a document, then it will not be summarized. Summary generator 214 will record a Boolean value set to true for each document that needs to be summarized. If there are any unused tokens, they are returned to the pot of total tokens which could be used for another longer document.

In some examples, summary generator 214 in the pre-summarization stage may allocate the final maximum prompt space for a document with raw length L; using a weighting based upon the relevance score $x_i$. So instead of using maximum prompt space $l_i$ equally for all documents using $l_i = L_F/N$, summary generator 214 may allocate $$l_i = \frac{x_i}{\sum_{i=1}^{N} x_i} L_F$$

prompt space for each document i based on their relevancy score. Similar to the proposed method, any unused tokens are reclaimed to use for a longer document or avoid using them to improve the resource efficiency of generative AI model 108.

Summary generator 214 saves the summarization results of the pre-summarization stage in a set of Boolean s; variables indicating if a document requires summarization in order to be included in the final prompt. If $s_i=0$, then it does not need summarization and may be included in the final prompt without incurring extra cost.

Summary generator 214 may split K-Cutoff value 219 number of documents into pre-summarisation LLM payloads as described above. In the selected K subset of documents, summary generator 219 may need to request generative AI model 108 by providing summarization prompt 251 to summarize the documents with a boolean value representing a summarization flag set to true. Some of the documents will be small enough that their raw token length is less than their final prompt allocation $l_i < L_i$ when $s_i = 1$ (where $l_i$ is the allocated length and $L_i$ is the raw content length). However, some documents will be too long for summarization prompt 217 for generative AI model 108 (i.e., $l_i > L_p$). In such a scenario, document i needs to be split into ceil $(l_i/L_p)$ separate chunks before preparing summarization prompt 217 to summarize the document i. The number of summarization calls by summary generator 214 to generative AI model 108 will be $\Sigma_{i=1}^{K} s_i \text{ceil}(l_i/L_p)$ and the number of tokens used will be $T_{LLM} = \Sigma_{i=1}^{K} s_i l_i$.

The generative AI model 108 includes a "reducer" layer that concatenates the summaries of each chunk to prepare document summary 253.

Upon generating document summary 253 for all the K subset of documents, information retriever 110 of system 280 generates answer synthesis prompt 215 for generative AI model 108 using document summary 253. Generative AI model 108 processes answer synthesis prompt 215 to generate output payload including response 209. Computing device 102 processes the output payload to retrieve response 209 and present it in application UI 106 (not shown in FIG. 2D).

FIG. 2E is a flow diagram of an example embodiment of a dynamic depth document retrieval system 290, which is an example embodiment of system 100 shown in FIG. 1. As illustrated in FIG. 2E, the flow of information in system 290 is similar to the flow of information described above in system 280, except the model used to generate K-Cutoff value 219. System 290 includes a relevancy model 240 to determine K-cutoff value 219. Information retriever 110 of system 290 may use cutoff generator 212 to form cutoff prompt 217 for relevancy model 240. Relevancy model 240 generates output payload including K-cutoff value 219. Cutoff generator 12 may process the output payload to determine the K subset of documents to use to generate grounding data.

Afterward, information retriever 110 of system 270 generates grounding data of K subset of documents. Information retriever 110 may use grounding builder 216 to form answer synthesis prompt 215 for generative AI model 110 and include grounding data. Generative AI model 108 processes answer synthesis prompt 215 to generate output payload consisting response 209. Computing device 102 processes the output payload to retrieve response 209 and present it in application UI 106 (not shown in FIG. 2E).

Figure 3:
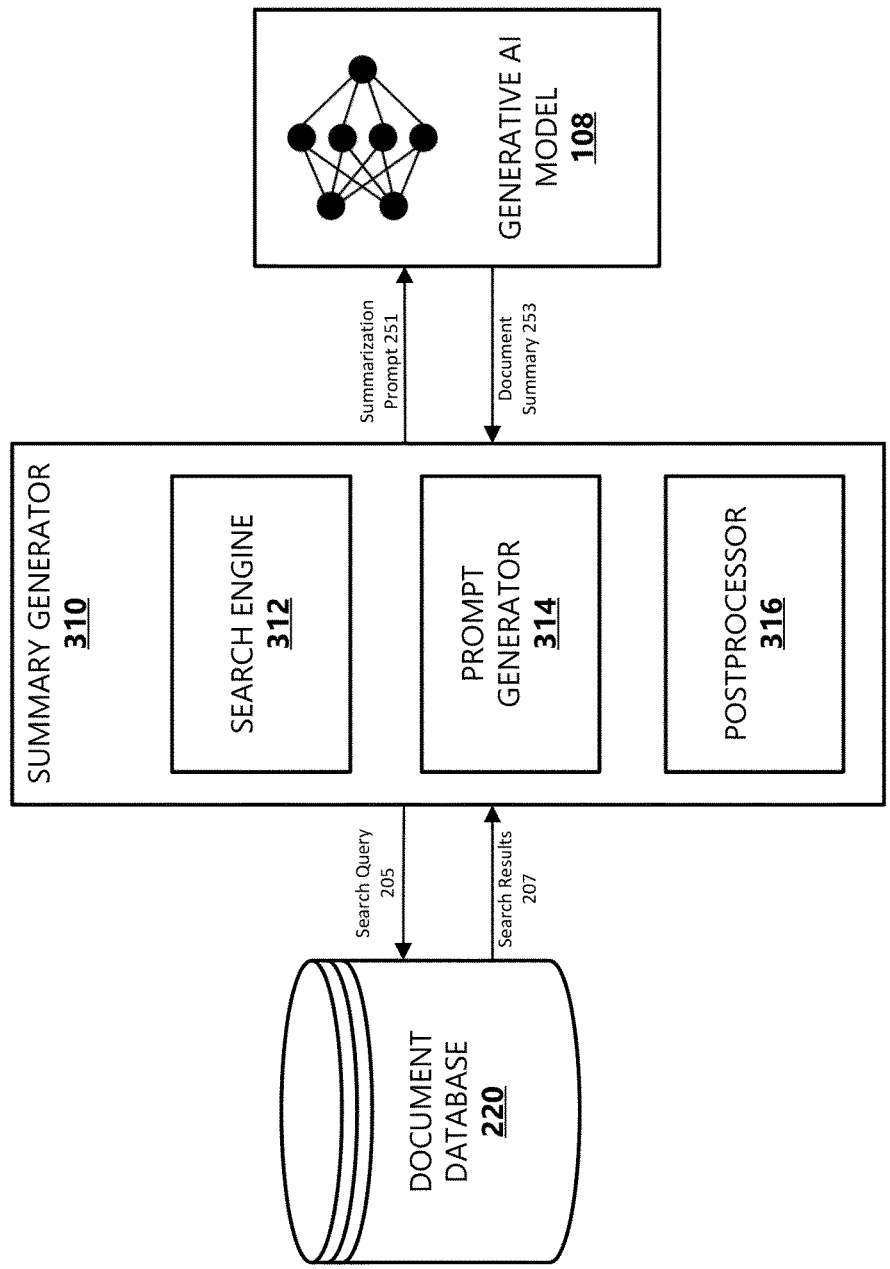
FIG. 3 is a block diagram of example components of a document summary generation system.

FIG. 3 is a block diagram of example components of a summary generator system 300. System 300 includes a summary generator 310 that includes a search engine 312, a prompt generator 314, and a postprocessor 316. The summary generator 216 is in communication with the document database 220 and the generative AI model 108.

The summary generation system 300 may be a part of (e.g., a component of) the information retriever 110. For instance, the summary generator 310 may form a portion of the software code that defines the information retriever 110.

In other examples, the summary generator 310 may be part of a separate service or application, such as a cloud-based service.

More specifically, when grounding generator 204 processes the grounding data to include in a prompt for the generative AI model 108, the summarization features of the technology discussed herein are automatically triggered or triggered in response to the allowed token limit of the prompt or other trigger. When the summarization features are triggered, the search results are communicated to the summary generator 310.

The search engine 312 then fetches the relevant documents (i.e., search results 207) from document database 220. The relevant documents may be fetched by querying the documents database 220 for the relevant documents stored therein. The relevant documents for the search query 205 are then returned to the search engine 312. In some examples, search engine 312 may fetch relevant documents based on the documents listed in search results 207. For example, search results may include paths on a file system pointing to relevant documents used to access the relevant documents.

The prompt generator 314 then generates a summarization prompt 251 for the generative AI model 108. The summarization prompt 251 includes the contents of the search results 207. In examples where relevancy scores are needed in determining a summary of a document, relevancy scores may also be included in the summarization prompt 251.

Figure 4:
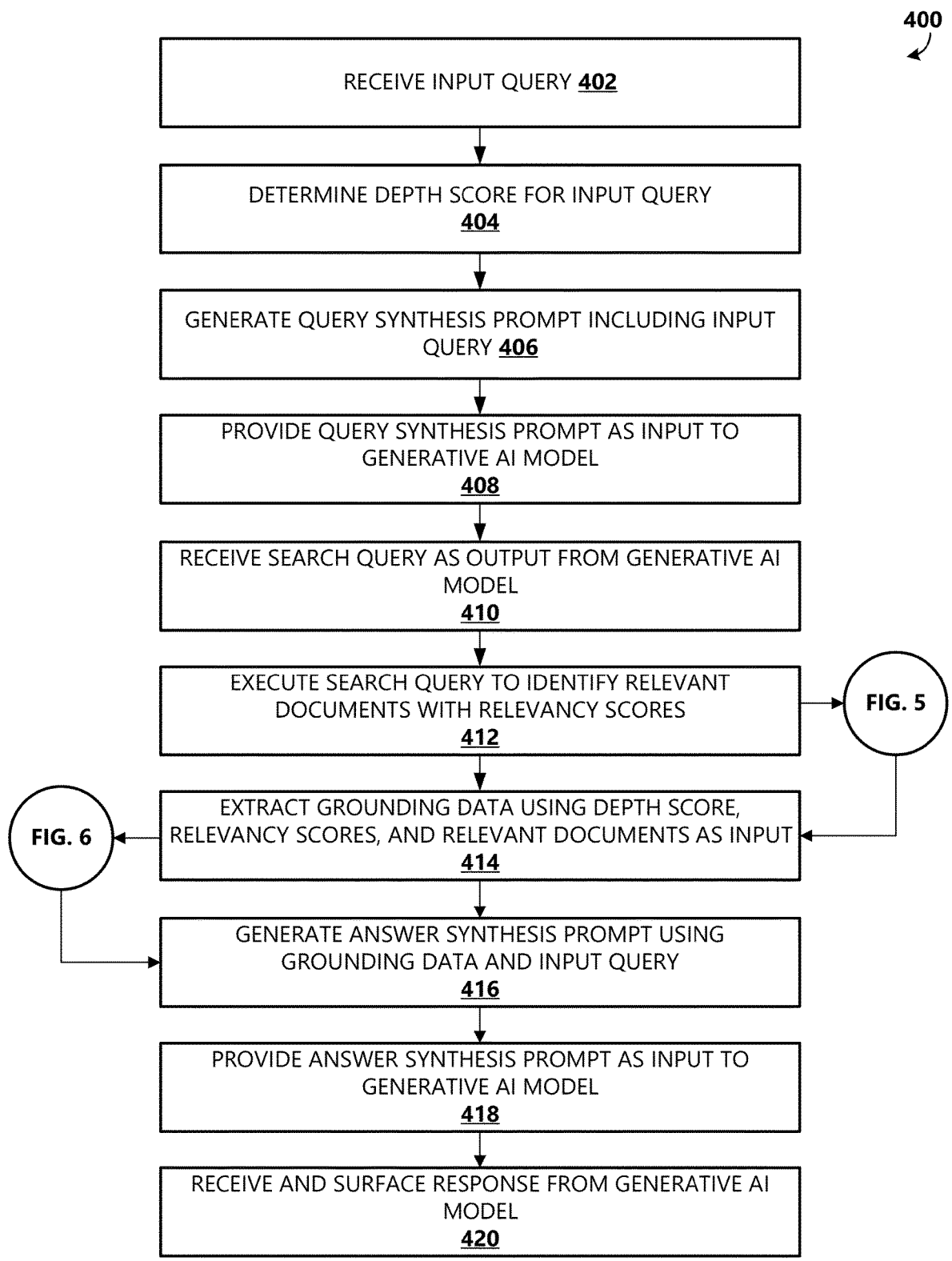
FIG. 4 depicts an example method of generating a response to a query against input documents.

FIG. 4 depicts an example method 400 of generating a response to a query against input documents. The operations of method 400 may be performed by one or more the devices of the systems discussed herein. For instance, a computing device (such as server or cloud computing device) may include at least one processor and memory storing instructions that, when executed by the at least one processor, cause the operations of method 400 to be performed. For example, a server in communication with information retriever 110 may perform the operations of FIG. 4. The server may include the information retriever 110 and its respective components, as discussed above.

At operation 402, an input query is received. Input query may be received as an input to an application on a computing device for retrieving information based on a closet set of available documents. In some examples, the set of available documents is provided as input along with the input query. For example, the locations of the set of documents may be provided as input along with the input query. In some examples, input query may be received over a network on a remote server to retrieve information. For example, a user may use a user interface presented on display 106 of computing device 102 to provide an input query that is transmitted to a remote server or a cloud service to process and retrieve information.

At operation 404, the input query is processed by a machine learning model to predict the number of documents required to respond to the input query. For example, the input query (e.g., input query 201 of FIG. 2A) is provided as input to depth intent model 230 (as shown in FIG. 2A) to determine depth score 203 (as shown in FIG. 2A).

The machine learning model may be a language model predicting the number of documents. In some examples, a generative AI model may be used to both predict the number of documents and retrieve information from the documents. For example, input query 201 (as shown in FIG. 2B) is provided as input to generative AI model 108 (as shown in FIG. 2B) to generate depth score 203 (as shown in FIG. 2B). Input query may need to be pre-processed to produce a prompt for the generative AI model to output the predicted number of documents needed to retrieve the information.

At operation 406, the received input query from operation 402 is processed to generate a query synthesis prompt for a generative AI model. For example, input query 201 (as shown in FIG. 2A) is used to produce the query synthesis prompt 211 (as shown in FIG. 2A) to supply to the generative AI model 108 (as shown in FIG. 2A). In some examples, the depth score 203 may also be incorporated into the query synthesis prompt or otherwise be used to generate the query synthesis prompt.

The generated query synthesis prompt includes static segments and dynamic segments. The dynamic segments are populated with the data from the input query and data obtained using the input query. For example, the dynamic segments are populated with the text in the input query 201, and, in some examples, the depth score 203 that is obtained using the input query 201. The static portions may include user intent present in the input query, the scenario in which the input query was posted, and/or segment of the documents indicated in the input query. In some other examples, the static portions may include request instructions that instruct the generative AI model to detect primary topics, style, and tone of the text in the input query.

At operation 408, the generated query synthesis prompt is provided as input to the generative AI model. The model processes the received query synthesis prompt and generates as an output payload, as discussed herein. The output payload is received at operation 410.

At operation 410, the received output payload is processed to extract a search query to identify relevant documents to help respond to the received input query. For example, output payload, including search query 213 (as shown in FIG. 2A), is processed to execute the search query.

At operation 412, the search query is executed to identify relevant documents presented as search results. The search results may include additional details about the relevant documents. For example, the search query 205 (as shown in FIG. 2A) may be used to query the document database 220 (as shown in FIG. 2A) containing documents related to the input query 201 (as shown in FIG. 2A) to output the search results 207 (as shown in FIG. 2A). The search results may include a listing of relevant documents along with the relevancy scores of each of the relevant documents. The relevancy score associated with a document identifies its level of relevancy for the input query received in operation 402. In some examples, method 400 may jump after operation 412 to perform operations of method 500, as presented in the FIG. 5 description below. The operations of method 500 include further processing the relevant documents identified by executing the search query.

At operation 414, grounding data to include in a prompt for the generative AI model is extracted using the previously determined depth score in operation 404, relevant documents in operation 412, and the relevancy scores of the relevant documents in operation 412. In some examples, grounding data is extracted using relevant documents and relevancy scores that were processed by method 500.

The relevancy score of a document may be used to prioritize the order in which to include content in the relevant document in the prompt for the generative AI model. In other examples, the relevancy score is used to determine the amount of content from the relevant document to include in the grounding data. For instance, the higher the relevancy score of a document the more the content of a document is included in the prompt.

In some examples, method 400 may jump after operation 414 to perform operations of method 600, as presented in FIG. 6 description below. The operations of method 600 include further processing the content of the relevant documents to generate grounding data.

At operation 416, an answer synthesis prompt is generated using grounding data from operation 414 and input query received in operation 402. In some examples, the answer synthesis prompt is generated using grounding data further processed by method 600.

The generated answer synthesis prompt includes static segments and dynamic segments. The dynamic segments are populated with data from the relevant documents. For instance, the dynamic segments are populated with the content of the relevant documents. The static portions may include user intent present in the input query, the scenario in which the input query was posted, and/or segment of the documents indicated in the input query. In some examples, the static portions may include request instructions that instruct the generative AI model to detect primary topics, styles, tone of the document, and/or the input query.

At operation 418, the answer synthesis prompt from operation 416 is provided as input to the generative AI model 108. The generative AI model processes the received answer synthesis prompt and generates as an output payload as discussed herein. The output payload is received at operation 420. For example, answer synthesis prompt 207 (as shown in FIG. 2A) is provided to the generative AI model 108 (as shown in FIG. 2A) to generate response 209 (as shown in FIG. 2A).

At operation 420, a response to the input query is received by a computing device and presented to a user who submitted the input query. For example, response 209 (as shown in FIG. 2A) produced by the generative AI model 108 (as shown in FIG. 2A) is presented or otherwise surfaced on the application UI 106 (as shown in FIG. 1) shown on the display screen 104 (as shown in FIG. 1) of the computing device 102 (as shown in FIG. 1).

Figure 5:
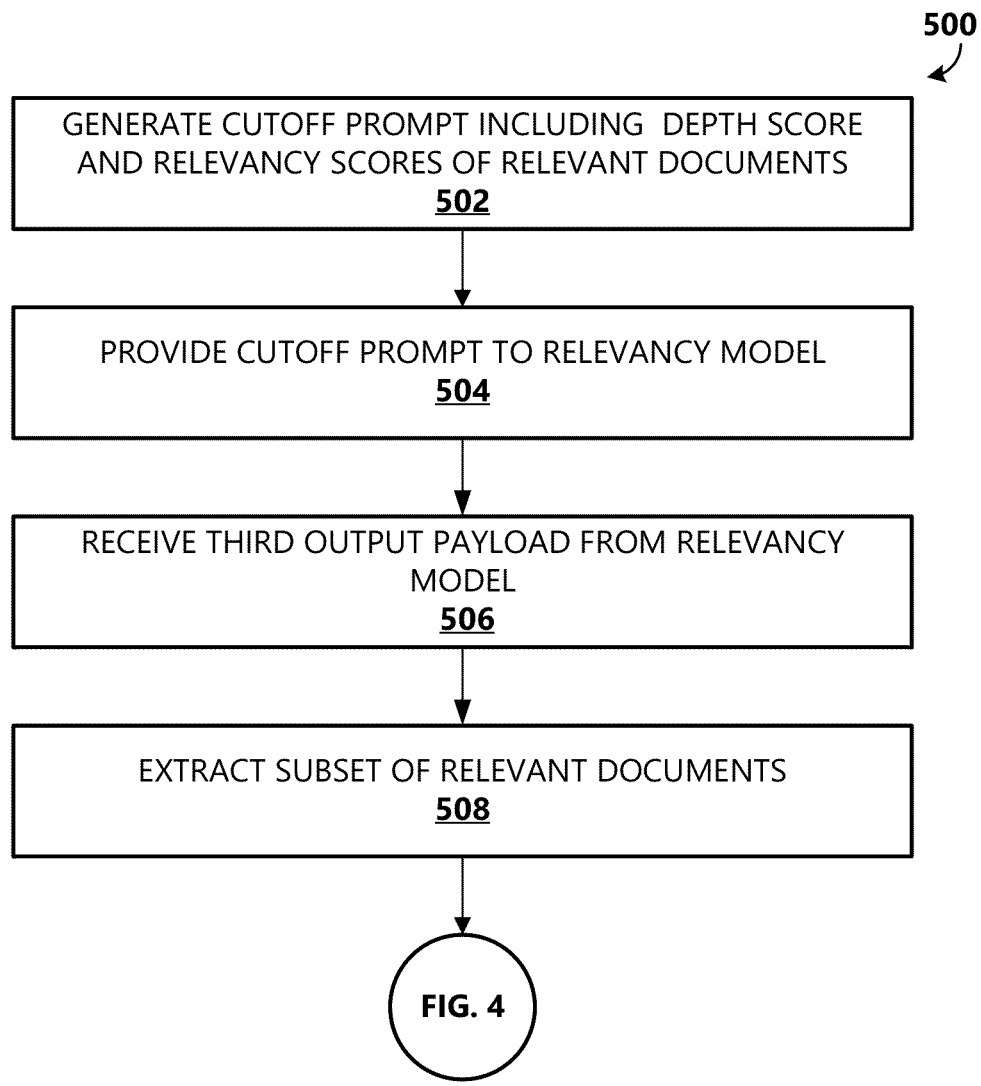
FIG. 5 depicts an example method for generating a subset of relevant documents.

FIG. 5 depicts an example method for generating a subset of relevant documents. The operations of method 500 may be performed by one or more the devices of the systems discussed herein. For instance, a computing device (such as a server or cloud computing device) may include at least one processor and memory storing instructions that, when executed by the at least one processor, cause the operations of method 500 to be performed. For example, a server in communication with an information retriever application may perform the operations of method 500. The server may include the grounding generator and its respective components, as discussed above. Operations of method 500 may also be performed by the information retriever application itself as well.

At operation 502, a cutoff prompt is generated to determine the subset of relevant documents to use to respond to an input query. The cutoff prompt includes a depth score indicating a predicted number of relevant documents and an actual set of relevant documents with their individual relevancy scores.

The generated cutoff prompt includes static segments and dynamic segments. The dynamic segments are populated with data from the relevant documents. For instance, the dynamic segments are populated with the content of the relevant documents. The static portions may include user intent present in the input query, the scenario in which the input query was posted, and/or segment of the documents indicated in the input query. In some examples, the static portions may include request instructions that instruct the machine learning model to detect primary topics, styles, tone of the document, and/or the input query.

At operation 504, a cutoff prompt is provided to a machine learning model. The model processes the received cutoff prompt and generates as an output payload, as discussed herein. The output payload is received at operation 506. For example, cutoff prompt 217 (as shown in FIG. 2C) is provided to the relevancy model 240 (as shown in FIG. 2E). The cutoff prompt also includes additional static segments, such as the request instructions, output formatting instructions, and/or citation instructions, as discussed above.

In some examples, a cutoff prompt is provided to a machine learning model, which is not a language model, to determine a subset of relevant documents. For example, cutoff prompt 217 (as shown in FIG. 2E) is provided to relevancy model 240 (as shown in FIG. 2E).

At operation 506, a third output payload is received from the relevancy model 240. The third output payload is processed to identify the subset of relevant documents identified in method 400 in operation 412. For example, the K-Cutoff value 219 (as shown in FIG. 2E) produced by the relevancy model 240 (as shown in FIG. 2E) is received from the relevancy model 240 (as shown in FIG. 2E). The subset of documents selected based on the K-Cutoff value are the most relevant documents for input query received in method 400 in operation 402. The K-Cutoff value for identifying a subset of documents is chosen to be at least the depth score provided as part of the cutoff prompt.

At operation 508, a subset of relevant documents is extracted from the search results. For instance, the top K number (based on the K-Cutoff value) of the documents in the search results (ordered by relevancy score) are extracted or selected. Accordingly, the count of the subset of the relevant documents matches the count of the K-Cutoff value extracted from the third output payload in operation 506 above. In some examples, the subset of relevant documents may include only the document with the highest relevancy score. Related documents may be ordered by their relevancy scores obtained in method 400 in operation 412 to identify the subset cutoff number of documents.

Returning to method 400 depicted in FIG. 4, at operation 414, grounding data is generated using the subset of relevant documents extracted in operation 508. In some examples, the relevancy scores associated with the subset of relevant documents is recalculated based on the subset. The updated relevancy scores associated with the subset of relevancy documents is returned to generate grounding data.

Figure 6:
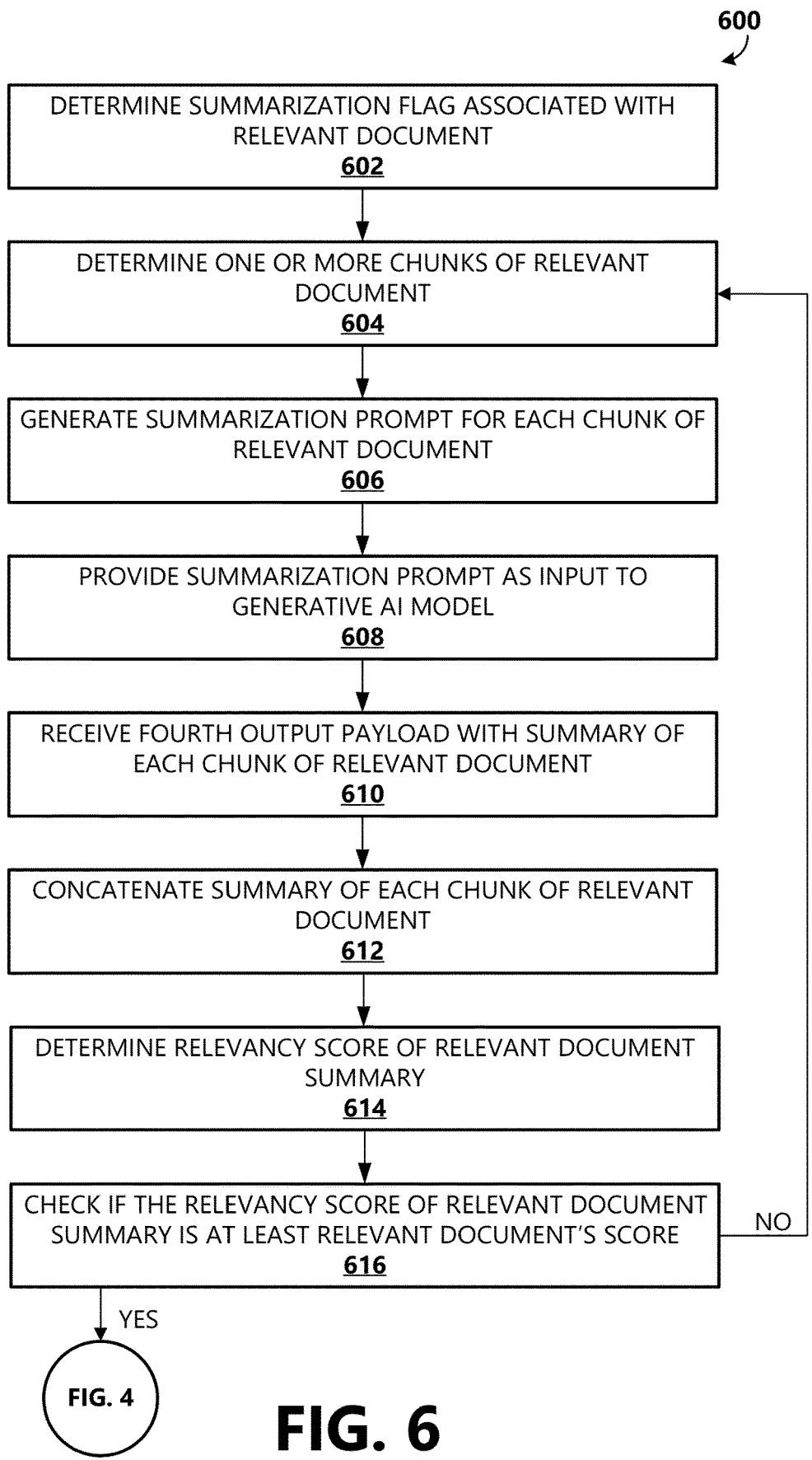
FIG. 6 depicts an example method of generating a document summary.

FIG. 6 depicts an example method for generating a summary of each of the relevant documents. The operations of method 600 may be performed by one or more the devices of the systems discussed herein. For instance, a computing device (such as server or cloud computing device) may include at least one processor and memory storing instructions that, when executed by the at least one processor, cause the operations of method 600 to be performed. For example, a server in communication with an information retriever application 112 (as shown in FIG. 1) may perform the operations of method 600. The server may include the grounding generator and its respective components, as discussed above. Operations of method 600 may also be performed by the information retriever application itself as well.

At operation 602, a summarization flag associated with a relevant document is determined to identify documents that may need to be summarized before being incorporated into a prompt. The summarization flag of a relevant document is set based on the length of the document. The summarization flag is set to true if the total length of the document is greater than the total size of the prompt provided as input to a generative AI model. For example, summarization generator 310 (as shown in FIG. 3) uses search engine 312 (as shown in FIG. 3) and receives search results 20 (as shown in FIG. 3), including relevant documents to determine a summarization flag. In some examples, the summarization flag of a relevant document is set to true if the total length of the document is greater than the size of the total number of tokens in a prompt to the generative AI model assigned to the relevant document to respond to the input query.

At operation 604, one or more chunks of the relevant document selected in operation 602 are generated to help summarize the documents. Multiple chunks of the relevant document are generated if a document's length is more than the prompt provided to the generative AI model to generate a summary of the document. In such cases, multiple chunks of the relevant document are generated each of length at max equaling the total prompt size. Grounding generator 204, upon generating chunks provides each chunk to operation 606 to help generate the summary of the relevant document.

At operation 606, summarization prompt is generated for each chunk of the relevant document of all chunks generated in operation 604 above. For example, prompt generator 314 (as shown in FIG. 3) of the summary generator 310 (as shown in FIG. 3) generates summarization prompt 251 (as shown in FIG. 3) for each chunk of the relevant document.

At operation 608, the summarization prompt is provided as input for the generative AI model 108. The model processes the received summarization prompt and generates as an output payload, as discussed herein. The output payload is received at operation 610.

At operation 610, a fourth output payload is received. The fourth output payload is processed to access a summary of each chunk generated in operation 604. For example, document summary 253 (as shown in FIG. 3), produced by the generative AI model 108 (as shown in FIG. 3), is received by summary generator 310 (as shown in FIG. 3).

At operation 612, summaries of chunks of a relevant document received at operation 610 are concatenated to form the complete summary of the document. In some examples, the amount of summarization is based on the relevancy score. If a document is less relevant it may be summarized more aggressively into an abridged text.

At operation 614, relevancy score is determined for the summary obtained in operation 612 above.

At operation 616, the relevancy score of the summary and the original document are compared. If the relevancy score of the summary is not less than the document's relevancy score. If yes, then return to method 400, depicted in FIG. 4, at operation 416, to generate a prompt for a generative AI model using the summaries of relevant documents generated in operation 612. Else, a new summary of the document is requested in method 600 by jumping to operation 604.

FIG. 7 is a block diagram illustrating physical components (e.g., hardware) of a computing device 700 with which examples of the present disclosure may be practiced. The computing device components described below may be suitable for one or more of the components of the systems described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750 (e.g., information retriever 110, search engine 202, grounding generator 204, and/or summary generators 310) and other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the methods 400, 500, and 600, illustrated in FIG. 4-6. Other program modules that may be used in accordance with examples of the present disclosure and may include applications such as search engines and database applications, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for performing resource-efficient retrieval of information using a generative AI model. The system includes at least one processor; and memory storing instructions that, when executed by the at least one processor, cause the system to perform operations. The operations include: receive an input query requesting information from a set of documents; determine a depth score for the input query using a depth intent model, wherein the depth score indicates a predicted number of documents of the set of documents needed to retrieve the information; generate a query synthesis prompt, including the input query; provide the query synthesis prompt as input to a generative AI model; receive, in response to the query synthesis prompt, a search query; execute the search query against the set of documents to identify documents of the set of documents relevant to the input query, wherein the identified relevant documents each include a relevancy score; based on the depth score and the relevancy score of each document of the identified relevant documents, extracting grounding data from the identified relevant documents; generate a answer synthesis prompt, including the grounding data and the input query; provide the answer synthesis prompt as input to the generative AI model; receive, in response to the answer synthesis prompt from the generative AI model, a response to the input query; and surface the response, wherein the response includes the requested information.

In an example, the extracting grounding data from the identified relevant documents further comprises: generating a cutoff prompt to identify the cutoff number of documents, including the input query and the relevancy score of each of the identified relevant documents; providing the cutoff prompt as input to the generative AI model; receiving, in response to the cutoff prompt, a subset of identified relevant documents of the identified relevant documents; and extracting grounding data from the subset of identified relevant documents. In another example, count of the subset of the identified relevant documents is at least the predicted number of documents. In still another example, extracting grounding data from the identified relevant documents further comprises: providing the depth score and the relevancy score of each of the identified relevant documents as input to a probabilistic function; receiving, a cutoff value identifying a subset of identified relevant documents of the identified relevant documents as output; and extracting grounding data from the subset of identified relevant documents.

In an example, extracting grounding data from the identified relevant documents further comprises: pre-summarizing each of the identified relevant documents by performing operations comprising: determining a summarization flag associated with each of the identified relevant documents based on a prompt size of the generative AI model; generating a summarization prompt for each document of the identified relevant documents, including the document and the associated summarization flag; providing the summarization prompt as input to the generative AI model; and receiving, in response to the summarization prompt, a fourth output payload from the generative AI model including a summary of the document. In still another example, generating the summarization prompt further comprises: determining one or more chunks of the document based on the length of the document and token size of the generative AI model; and generating the summarization prompt for each chunk of the one or more chunks of the document. In a further example, the operations further comprise concatenating summaries of the one or more chunks of the document to generate the summary of the document. In yet another example, size of the summary of the document is based on number of tokens of the answer synthesis prompt allowed to be used for the document. In still yet another example, wherein the number of tokens of the answer synthesis prompt allowed to be used for the document is maximum allowed size of the answer synthesis prompt divided by count of the identified relevant documents. In still yet another example, the number of tokens of the answer synthesis prompt allowed to be used for the document is determined using a weighted average of the relevancy score of the document of the identified relevant documents. In still yet another example, pre-summarizing each of the identified relevant documents further comprises determining relevancy score of the summary of the document; and pre-summarizing the document until the document summary's relevancy score is at least the document's relevancy score.

In an aspect, the technology relates to a system for performing resource-efficient retrieval of information using a generative AI model. The system includes at least one processor; and memory storing instructions that, when executed by the at least one processor, cause the system to perform operations. The operations include: receive an input query requesting information from a set of documents; determine a depth score for the input query using a depth intent model, wherein the depth score indicates a predicted number of documents of the set of documents needed to retrieve the information; generate a query synthesis prompt, including the input query; provide the query synthesis prompt as input to a generative AI model; receive, in response to the query synthesis prompt, a search query; execute the search query against the set of documents to identify documents of the set of documents relevant to the input query, wherein the identified relevant documents each include a relevancy score; generate a cutoff prompt including the depth score and the relevancy score of each of the identified relevant documents; provide the cutoff prompt as input to a relevancy model; receive, in response to the cutoff prompt, a subset of identified relevant documents of the identified relevant documents; based on the depth score and the relevancy score of each document of the subset of identified relevant documents, extracting grounding data from the subset of identified relevant documents; generate a answer synthesis prompt including the grounding data and the input query; provide the answer synthesis prompt as input to the generative AI model; receive, in response to the answer synthesis prompt, a second output payload from the generative AI model, including a response to the input query; and surface the response, wherein the response includes the requested information.

In an example, the depth intent model is trained using click logs identifying access information to the set of documents for the input query when provided to a search engine. In another example, the depth intent model is trained using labels generated using the generative AI Model, wherein the labels identify depth scores for a set of input queries.

In another aspect, the technology relates to a computer-implemented method for performing resource-efficient retrieval of information. The method includes receiving an input query requesting information from a set of documents; determining a depth score for the input query using a depth intent model, wherein the depth score indicates a predicted number of documents of the set of documents needed to retrieve the information; generating a query synthesis prompt, including the input query; providing the query synthesis prompt as input to a generative AI model; receiving, in response to the query synthesis prompt, a search query; executing the search query against the set of documents to identify sections of documents of the set of documents relevant to the input query, wherein the identified sections of documents each include a relevancy score; based on the depth score and the relevancy score of each document of the identified sections of documents, extracting grounding data from the identified relevant documents; generating a answer synthesis prompt including the grounding data and the input query; providing the answer synthesis prompt as input to the generative AI model; receiving, in response to the answer synthesis prompt from the generative AI model, a response to the input query; and surfacing the response, wherein the response includes the requested information.

In an example, extracting grounding data from the identified sections of documents further comprises: generating a cutoff prompt to identify the cutoff number of documents that includes the input query and the relevancy score of the section of the identified sections of documents; providing the cutoff prompt as input to the generative AI model; and receiving, in response to the cutoff prompt, a subset of identified sections of documents of the identified sections of documents.

In another example, providing the answer synthesis prompt as input to the generative AI model further comprises: receiving, in response to the answer synthesis prompt, a confirmation of sufficiency of the grounding data to respond to the input query from the generative AI model; and requesting the generative AI model to provide the response to the input query. In still another example, providing the answer synthesis prompt as input to the generative AI model further comprises: receiving, in response to the answer synthesis prompt, a rejection of sufficiency of the grounding data to respond to the input query from the generative AI model; and iterating to generate an updated search query and an updated answer synthesis prompt until the generative AI model confirms the sufficiency of the grounding data to respond to the input query. In further another example, the depth intent model is trained using click logs identifying access information to the set of documents for the input query when provided to a search engine. In yet another example, the depth intent model is trained using click logs identifying access information to the set of documents for the input query when provided to a search engine. In still yet another example, the depth intent model is trained using labels generated using the generative AI Model, wherein the labels identify depth scores for a set of input queries.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for performing a resource-efficient retrieval of information, the system comprising:
   at least one processor; and
   memory storing instructions that, when executed by the at least one processor, cause the system to perform operations comprising:
      receive an input query requesting information from a set of documents;
      determine a depth score for the input query using a depth intent model, wherein the depth score indicates a predicted number of documents of the set of documents needed to retrieve the information;
      generate a query synthesis prompt, including the input query, that requests analysis of the input query;
      provide the query synthesis prompt as input to a generative artificial intelligence (AI) model;
      receive, in response to the query synthesis prompt, a search query;
      execute the search query against the set of documents to identify documents, of the set of documents, relevant to the input query, wherein the identified relevant documents each have a relevancy score;
      based on the depth score and the relevancy score of each document of the identified relevant documents, extract grounding data from the identified relevant documents;
      generate an answer synthesis prompt, including the grounding data and the input query;
      provide the answer synthesis prompt as input to the generative AI model;
      receive, in response to the answer synthesis prompt and from the generative AI model, a response to the input query; and
      surface the response to the input query, wherein the response includes the requested information.

2. The system of claim 1, wherein extracting the grounding data from the identified relevant documents comprises:
   generating a cutoff prompt to identify a cutoff number of documents, the cutoff prompt including the input query and the relevancy score of each of the identified relevant documents;
   providing the cutoff prompt as input to the generative AI model;
   receiving, in response to the cutoff prompt, a subset of identified relevant documents of the identified relevant documents; and
   extracting the grounding data from the subset of identified relevant documents.

3. The system of claim 2, wherein a count of the subset of the identified relevant documents is at least the predicted number of documents.

4. The system of claim 1, wherein extracting the grounding data from the identified relevant documents comprises:
   providing the depth score and the relevancy score of each of the identified relevant documents as input to a probabilistic function;
   receiving a cutoff value identifying a subset of identified relevant documents of the identified relevant documents as output from the probabilistic function; and
   extracting the grounding data from the subset of identified relevant documents.

5. The system of claim 1, wherein extracting the grounding data from the identified relevant documents is based on the relevancy score of each of the identified relevant documents.

6. The system of claim 1, wherein extracting the grounding data from the identified relevant documents comprises:
   pre-summarizing each of the identified relevant documents by performing operations comprising:
      determining a summarization flag associated with each of the identified relevant documents based on a prompt size of the generative AI model;
      generating a summarization prompt for each document of the identified relevant documents, including a respective document of the identified relevant documents and the associated summarization flag;
      providing the summarization prompt for each document of the identified relevant documents to the generative AI model; and
      receiving, in response to each summarization prompt, an output payload from the generative AI model including a summary of the respective document.

7. The system of claim 6, wherein generating the summarization prompt comprises:
   determining one or more chunks of a first document of the identified relevant documents based on a length of the first document and a token size of the generative AI model;
   generating a summarization prompt for each chunk of the one or more chunks of the first document; and
   concatenating summaries of the one or more chunks of the first document to generate a summary of the first document.

8. The system of claim 6, wherein a size of the summary of the respective document is based on a number of tokens of the answer synthesis prompt allowed to be used for the respective document.

9. The system of claim 8, wherein the number of tokens of the answer synthesis prompt allowed to be used for the document is a maximum allowed size of the answer synthesis prompt divided by a count of the identified relevant documents.

10. The system of claim 6, wherein the number of tokens of the answer synthesis prompt allowed to be used for the document is determined using a weighted average of the relevancy score of the document of the identified relevant documents.

11. The system of claim 6, wherein pre-summarizing each of the identified relevant documents comprises:

determining a relevancy score of the summary of the document; and pre-summarizing the document until the relevancy score of the summary of the document is at least the relevancy score of the document.

12. A system for performing a resource-efficient retrieval of information, the system comprising:

at least one processor; and memory storing instructions that, when executed by the at least one processor, cause the system to perform operations comprising:

receive an input query requesting information from a set of documents;

determine a depth score for the input query using a depth intent model, wherein the depth score indicates a predicted number of documents of the set of documents needed to retrieve the information;

generate a query synthesis prompt, including the input query;

provide the query synthesis prompt as input to a generative artificial intelligence (AI) model;

receive, in response to the query synthesis prompt, a search query;

execute the search query against the set of documents to identify documents, of the set of documents, relevant to the input query, wherein the identified relevant documents each have a relevancy score;

generate a cutoff prompt including the depth score and the relevancy score of each of the identified relevant documents;

provide the cutoff prompt as input to a relevancy model;

receive, in response to the cutoff prompt, a subset of identified relevant documents of the identified relevant documents;

based on the depth score and the relevancy score of each document of the subset of identified relevant documents, extract grounding data from the subset of identified relevant documents;

generate an answer synthesis prompt including the grounding data and the input query;

provide the answer synthesis prompt as input to the generative AI model;

receive, in response to the answer synthesis prompt, an output payload from the generative AI model, including a response to the input query; and surface the response, wherein the response includes the requested information.

13. The system of claim 12, wherein the depth intent model is trained using click logs identifying access information to the set of documents for the input query when provided to a search engine.

14. The system of claim 12, wherein the depth intent model is trained using labels generated using the generative AI Model, wherein the labels identify depth scores for a set of input queries.

15. A computer-implemented method for performing resource-efficient retrieval of information, the method comprising:

receiving an input query requesting information from a set of documents;

generating a query synthesis prompt, including the input query;

providing the query synthesis prompt as input to a generative artificial intelligence (AI) model;

receiving, in response to the query synthesis prompt, a search query;

executing the search query against the set of documents to identify documents, of the set of documents, relevant to the input query, wherein the documents each have a relevancy score;

generating an answer synthesis prompt including the relevancy scores of the documents and the input query;

providing the answer synthesis prompt as input to the generative AI model;

receiving, in response to the answer synthesis prompt from the generative AI model, a cutoff value for a number of relevant documents to be used for generating grounding data;

generating grounding data using a top number of documents equal to the cutoff value;

generating a cutoff prompt to identify the cutoff number of documents that includes the grounding data and the input query;

providing the cutoff prompt as input to the generative AI model;

receiving, in response to the cutoff prompt from the generative AI model, a response to the input query; and surfacing the response, wherein the response includes the requested information.

16. The computer-implemented method of claim 15, wherein the grounding data includes the entire content from the top number of documents equal to the cutoff value.

17. The computer-implemented method of claim 15, wherein the grounding data includes at least one section extracted from the top number of documents equal to the cutoff value.

18. The computer-implemented method of claim 15, wherein the grounding data includes summaries of the top number of documents equal to the cutoff value.

19. The computer-implemented method of claim 15, wherein larger amount of grounding data is extracted from the relevant documents having higher relevancy scores.

20. The computer-implemented method of claim 15, wherein the input query is received in a chat interface and the response is surfaced in the chat interface.

* * * * *